United States Patent [19]
Higashimoto

[11] Patent Number: 5,967,027
[45] Date of Patent: Oct. 19, 1999

[54] SMOKING APPARATUS

[75] Inventor: Tsuyoshi Higashimoto, Ikoma, Japan

[73] Assignee: Higashimoto Kikai Co., Ltd., Nara, Japan

[21] Appl. No.: 09/113,890

[22] Filed: Jul. 10, 1998

[30] Foreign Application Priority Data

Dec. 24, 1997 [JP] Japan ................................. 9-367936

[51] Int. Cl.⁶ .............................. A23L 1/31; A23B 4/044
[52] U.S. Cl. ............................... 99/472; 99/482; 99/534; 126/21 A
[58] Field of Search ........................... 99/482, 483, 472, 99/534; 126/21 A, 193, 198, 369

[56] References Cited

U.S. PATENT DOCUMENTS

| | | | |
|---|---|---|---|
| 4,455,924 | 6/1984 | Wenzel | 99/482 X |
| 4,757,756 | 7/1988 | Van Marr | 99/482 |
| 5,368,872 | 11/1994 | Davis, Jr. | 99/482 X |

FOREIGN PATENT DOCUMENTS

94/08462  4/1994  WIPO.

*Primary Examiner*—Reginald L. Alexander
*Attorney, Agent, or Firm*—Kirschstein, et al.

[57] ABSTRACT

A smoking apparatus includes a smoking chamber for containing the food material, a smoke or liquid smoke supply generator connected to the smoking chamber for feeding and spouting the smoke or liquid smoke into the smoking chamber, and a vacuum pump connected to the smoking chamber for making the smoking chamber vacuous. A control device is connected to the vacuum pump and the supply generator. The control device is programmed to previously operate the vacuum pump so that the vacuum pump makes the smoking chamber vacuous to exhaust the food material of air, and then operate the supply generator so that the supply generator spouts the smoke or liquid smoke into the smoking chamber to smoke the food material with the smoke or liquid smoke.

10 Claims, 6 Drawing Sheets

SMOKING APPARATUS

FIELD OF THE INVENTION

The invention relates to a smoking apparatus for smoking a food material with a smoke or liquid smoke.

PRIOR ART

In the processing step of a loin roll or boneless ham, there has been generally used a smoking apparatus including a smoking chamber for containing a meat material of ham. The meat material is compressively filled into casings which are then fed into and put in the smoking chamber. The casing is permeable to smoke. In addition, a smoke generator is connected to the smoking chamber for feeding and spouting a smoke into the smoking chamber. The smoke therefore permeates into the meat material through the casing in the smoking chamber to smoke the meat material with the smoke.

In the case, it is problematic that the smoke may not always sufficiently permeate into the meat material but merely adhere to the outer surface of the meat material, lowering the quality of ham, making it difficult to keep a flavor of ham and fading the colour of ham due to lack of the permeance of smoke, to shorten a shelf life or relishing term of ham. In addition, the meat material includes a salinity mixed therewith. However, the salinity may flow in the meat material to be concentrated toward the tied portion of the casing when the meat material is compressively filled into the casing, spoiling the taste of ham due to concentration of the salinity after smoking. Furthermore, the meat material may involve bubbles therein when compressively filled into the casing, resulting in air holes formed in the meat material. Air gaps may be left between meat masses constituting the meat material when compressively filled into the casing, resulting in separating layers formed in the meat material. It is therefore necessary to cut away the portions including the air holes or separating layers for disposal as wastes when slicing the ham, resulting in a decrease in yield of the meat material.

By the way, in the processing step of a sausage, a meat material of sausage is compressively filled into casings. A smoke may then permeate into the meat material through the casing in a smoking chamber to smoke the meat material with the smoke. In the case, it has the same problems as those described above, relating to the permeance of smoke, the concentration of salinity, the air holes and the separating layers. In the processing step of a bacon, a smoke directly permeates into a meat material of bacon in a smoking chamber to smoke the meat material with the smoke. However, it has the same problems as those described above, relating to the permeance of smoke or liquid smoke. In addition, it is generally practical to smoke a food material other than the meat material with a smoke. It is also general to feed and spout not a smoke but a liquid smoke into a smoking chamber and smoke the food material with the liquid smoke. In any case, it has the same problems as those described above, relating to the permeance of smoke or liquid smoke.

SUMMARY OF THE INVENTION

It is therefore an object of the invention to provide a novel and improved apparatus for smoking a food material with a smoke or liquid smoke, to thereby overcome the above problems.

Other object of the invention is to smoke the food material without lowering the quality of food, without making it difficult to keep a flavor of food and without fading the colour of food due to lack of the permeance of smoke or liquid smoke.

Other object of the invention is to smoke the food material without spoiling the taste of food due to concentration of the salinity.

Other object of the invention is to smoke the food material in such a way to minimize air holes or separating layers in the food material, resulting in an increase in yield of the food material.

According to the invention, there is provided a smoking apparatus for smoking a food material with a smoke or liquid smoke. The apparatus comprises means for exhausting the food material of air before smoking.

In a preferred embodiment, the apparatus comprises a smoking chamber for containing the food material, smoke or liquid smoke supply means connected to the smoking chamber for feeding and spouting the smoke or liquid smoke into the smoking chamber, and vacuum means connected to the smoking chamber for making the smoking chamber vacuous. The apparatus further comprises a control device connected to the vacuum means and the supply means, the control device being programmed to previously operate the vacuum means so that the vacuum means makes the smoking chamber vacuous to exhaust the food material of air, and then operate the supply means so that the supply means spouts the smoke or liquid smoke into the smoking chamber to smoke the food material with the smoke or liquid smoke.

The supply means may comprise a smoke generator connected to the smoking chamber by means of valve means for feeding and spouting the smoke into the smoking chamber. The vacuum means may comprise a vacuum pump connected to the smoking chamber by means of valve means for making the smoking chamber vacuous.

The supply means may alternatively comprise a liquid smoke cylinder connected to the smoking chamber by means of valve means for feeding and spouting the liquid smoke into the smoking chamber.

The food material may comprise a meat material of ham. The smoking chamber may include ventilating means for ventilating the interior of the smoking chamber. The control device is further connected to the ventilating means and programmed to firstly operate the vacuum means so that the vacuum means makes the smoking chamber vacuous to exhaust the meat material of air. The control device is further programmed to secondly operate the ventilating means so that the ventilating means ventilates the interior of the smoking chamber to dry the meat material. The control device is further programmed to then operate the vacuum means so that the vacuum means makes the smoking chamber vacuous to re-exhaust the meat material of air. The control device is further programmed to then operate the supply means so that the supply means spouts the smoke or liquid smoke into the smoking chamber to smoke the food material with the smoke or liquid smoke.

The control device may be programmed to alternately operate the vacuum means and the ventilating means to exhaust the meat material of air and dry the meat material over and over again before re-exhausting and smoking.

The smoking chamber may further include heater means for heating the interior of the smoking chamber, cooler means for cooling the interior of the smoking chamber, and a temperature sensor for detecting the temperature in the smoking chamber and generating a detecting signal. The control device is further connected to the heater means, the cooler means and the temperature sensor and programmed to operate the heater means or the cooler means in response to the signal from the temperature sensor to adjust and maintain the temperature in the smoking chamber within a predetermined range of temperature.

The smoking chamber may further include a humidity sensor for detecting the humidity therein and generating a detecting signal. The control device is further connected to the humidity sensor and programmed to operate the ventilating means in response to the signal from the humidity sensor to adjust and maintain the humidity in the smoking chamber within a predetermined range of humidity when drying.

In another embodiment, the smoking chamber includes heater means for heating the interior of the smoking chamber, spray nozzle means for spraying a water into the smoking chamber, and ventilating means for ventilating the interior of the smoking chamber. The control device is further connected to the heater means, the spray nozzle means and the ventilating means and programmed to firstly operate the vacuum means so that the vacuum means makes the smoking chamber vacuous to exhaust the meat material of air. The control device is further programmed to secondly operate the heater means and the spray nozzle means so that the heater means heats the interior of the smoking chamber, the spray nozzle means spraying the water into the smoking chamber, to heat and redden the meat material under a relatively high humidity. The control device is further programmed to then operate the heater means and the ventilating means so that the heater means heats the interior of the smoking chamber, the ventilating means ventilating the interior of the smoking chamber, to heat and dry the meat material under a relatively low humidity. The control device is further programmed to then operate the vacuum means so that the vacuum means makes the smoking chamber vacuous to re-exhaust the meat material of air. The control device is further programmed to then operate the supply means so that the supply means spouts the smoke or liquid smoke into the smoking chamber to smoke the food material with the smoke or liquid smoke.

The apparatus may further comprise boiler means connected to the smoking chamber for feeding and spouting a steam into the smoking chamber. The control device is further connected to the boiler means and programmed to operate the vacuum means and the boiler means after smoking so that the vacuum means intermittently makes the smoking chamber vacuous to decrease and increase the pressure in the smoking chamber over and over again for fluctuation, the boiler means spouting the steam into the smoking chamber, to cook the meat material with the steam under the fluctuating pressure.

The apparatus may further comprise a showering chamber disposed adjacent to the smoking chamber for showering a water onto the meat material, and a cooling chamber disposed adjacent to the showering chamber for cooling the meat material. The meat material is fed into the showering chamber from the smoking chamber for showering. The meat material is then fed into the cooling chamber from the showering chamber for cooling.

DESCRIPTION OF THE INVENTION

Figure 1:
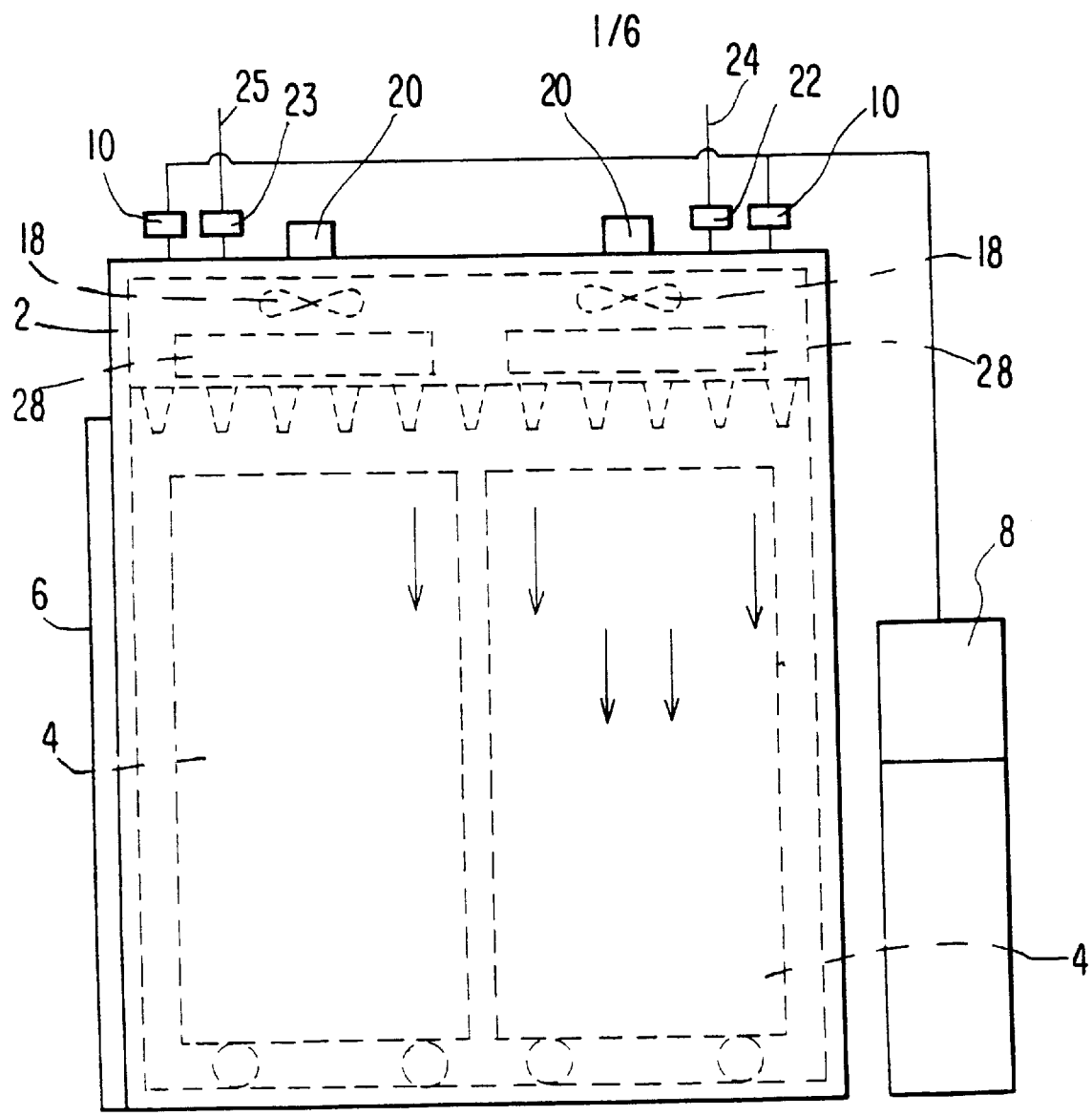
FIG. 1 is a side view of a preferred embodiment of the invention.

Turning now to the drawings, FIG. 1 illustrates a smoking apparatus for smoking a meat material of loin roll or boneless ham, according to the invention. The apparatus includes a smoking chamber 2 for containing the meat material. The meat material is compressively filled into casings which are then carried by and hung from trolleys 4. The trolleys 4 are moved into and put in the smoking chamber 2 through a door 6 so that the meat material is fed into and put in the smoking chamber 2. The door 6 is manually or automatically opened and closed when and after the meat material is fed into and put in the smoking chamber 2.

Figure 2:
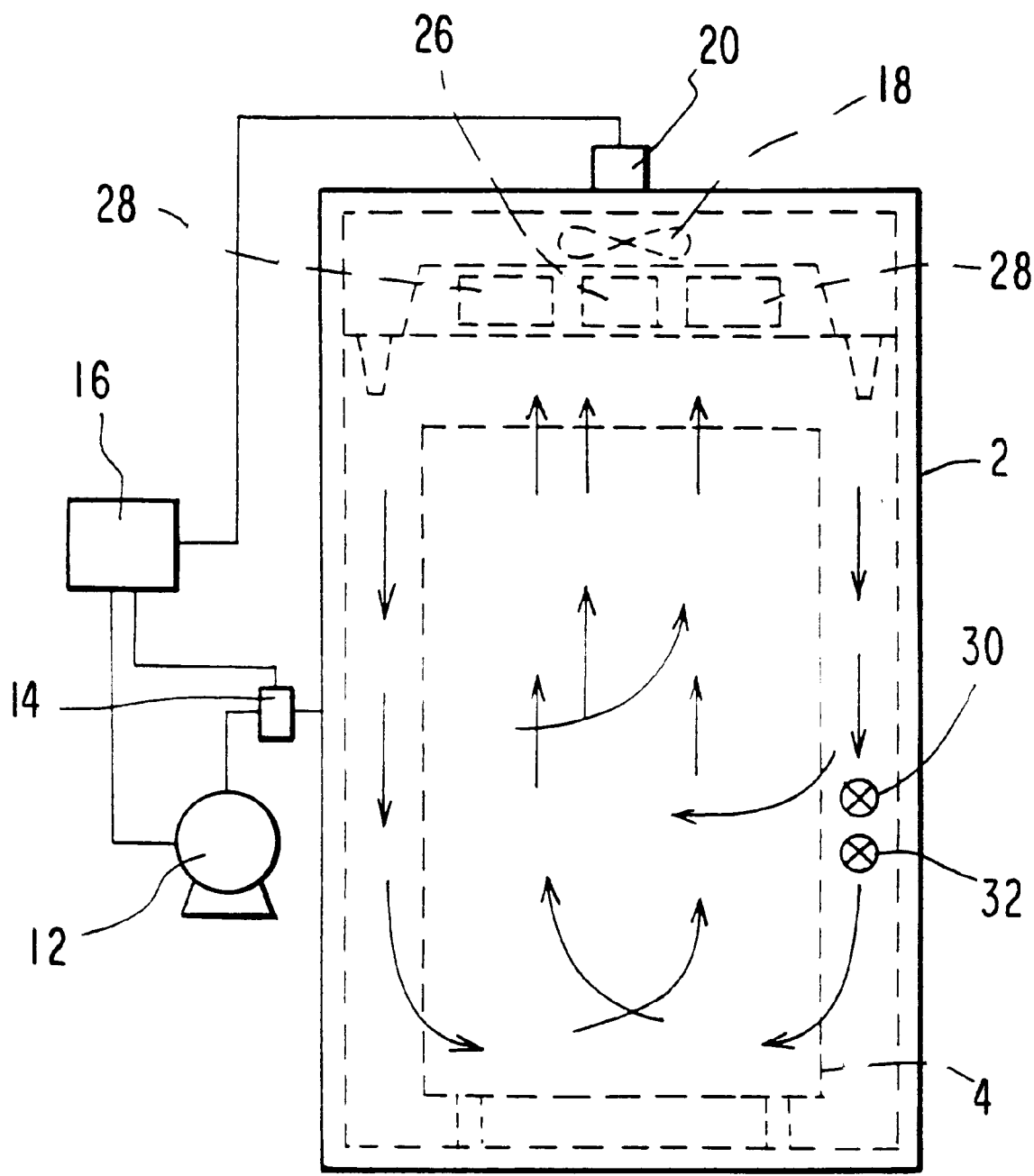
FIG. 2 is an elevational view of the apparatus of FIG. 1.

The apparatus further includes smoke or liquid smoke supply means which comprises a smoke generator 8 connected to the smoking chamber 2 by means of valve means 10 for feeding and spouting a smoke into the smoking chamber 2. The apparatus further includes vacuum means which comprises a vacuum pump 12 connected to the smoking chamber 2 by means of valve means 14 for making the smoking chamber 2 vacuous, as shown in FIG. 2. The valve means 10 and 14 comprise flaps respectively.

The apparatus further includes a control device 16 connected to the vacuum pump 12, the smoke generator 8 and the valve means 10 and 14. The control device 16 is programmed to previously operate the vacuum pump 12 and operate and open the valve means 14 so that the vacuum pump 12 makes the smoking chamber 2 vacuous to exhaust the meat material of air after the meat material is put in the smoking chamber 2. The control device 16 is further programmed to then operate the smoke generator 8 and operate and open the valve means 10 so that the smoke generator 8 spouts the smoke into the smoking chamber 2. The meat material is compressively filled into the casing, as described above, the casing being permeable to smoke. The smoke therefore permeates into the meat material through the casing in the smoking chamber 2 to smoke the meat material with the smoke.

In the embodiment, the smoking chamber 2 further includes two fans 18 disposed in the smoking chamber 2 adjacent to the top wall thereof. The fans 18 are connected to and driven by motors 20 to direct the air upward in the smoking chamber 2 at the central portion thereof and downward in the smoking chamber 2 at the circumferential portion thereof for circulation.

In addition, in the embodiment, the apparatus is intended to process a raw ham. In this connection, the smoking chamber 2 further includes ventilating means comprising inlet and outlet valve means 22 and 23 in the form of flaps. The valve means 22 and 23 are disposed in passages 24 and 25 which are connected to ports formed in the top wall of the smoking chamber 2 for ventilating the interior of the smoking chamber 2.

The control device 16 is further connected to the valve means 22 and 23 and the fans 18 and programmed to firstly operate the vacuum pump 12 and operate and open the valve means 14 so that the vacuum pump 12 makes the smoking chamber 2 vacuous to exhaust the meat material of air. The control device 16 is further programmed to secondly stop the vacuum pump 12, close the valve means 14, operate the fans 18 and operate and open the valve means 22 and 23 so that the valve means 22 and 23 cooperate with the fans 18 to ventilate the interior of the smoking chamber 2 through the passages 24 and 25 to dry the meat material. The control device 14 may be programmed to close the valve means 14 and open the valve means 22 and 23 to ventilate the interior of the smoking chamber 2 and dry the meat material without stopping the vacuum pump 12.

The control device 16 is further programmed to then stop the fans 18, close the valve means 22 and 23, operate the vacuum pump 12 and open the valve means 14 so that the vacuum pump 12 makes the smoking chamber 2 vacuous to re-exhaust the meat material of air. The control device 16 is further programmed to then close the valve means 14, 22 and 23, operate the fans 18, operate the smoke generator 8 and operate and open the valve means 10 so that the smoke generator 8 spouts the smoke into the smoking chamber 2 to smoke the meat material with the smoke.

The control device 16 may be programmed to alternately operate the vacuum pump 12, the fans 18 and the valve means 14, 22 and 23 to exhaust the meat material of air and dry the meat material over and over again before re-exhausting and smoking. The trolleys 4 are moved out of the smoking chamber 2 so that the meat material is discharged out of the smoking chamber 2 after smoking.

The smoking chamber 2 further includes heater means comprising heaters 26 which are disposed in the smoking chamber 2 adjacent to the top wall thereof. The fans 18 direct the air for circulation through the heaters 26 in the smoking chamber 2 so that the heaters 26 can heat the interior of the smoking chamber 2. The smoking chamber 2 further includes cooler means comprising coolers 28 which are disposed on the opposite sides of the heaters 26 adjacent to the top wall of the smoking chamber 2. The fans 18 direct the air for circulation through the coolers 28 in the smoking chamber 2 so that the coolers 28 can cool the interior of the smoking chamber 2.

In addition, the smoking chamber 2 includes a temperature sensor 30 disposed in the smoking chamber 2 for detecting the temperature in the smoking chamber 2 and generating a detecting signal. The smoking chamber 2 further includes a humidity sensor 32 disposed in the smoking chamber 2 for detecting the humidity in the smoking chamber 2 and generating a detecting signal.

The control device 16 is further connected to the heaters 26, the coolers 28 and the temperature sensor 30 and programmed to operate the heaters 26 or the coolers 28 in response to the signal from the temperature sensor 30 to adjust and maintain the temperature in the smoking chamber 2 within a predetermined range of temperature when exhausting, drying, re-exhausting and smoking. The control device 16 is further connected to the humidity sensor 32 and programmed to open or close the valve means 22 and 23 in response to the signal from the humidity sensor 32 to adjust and maintain the humidity in the smoking chamber 2 to a predetermined range of humidity when drying.

Figure 3:
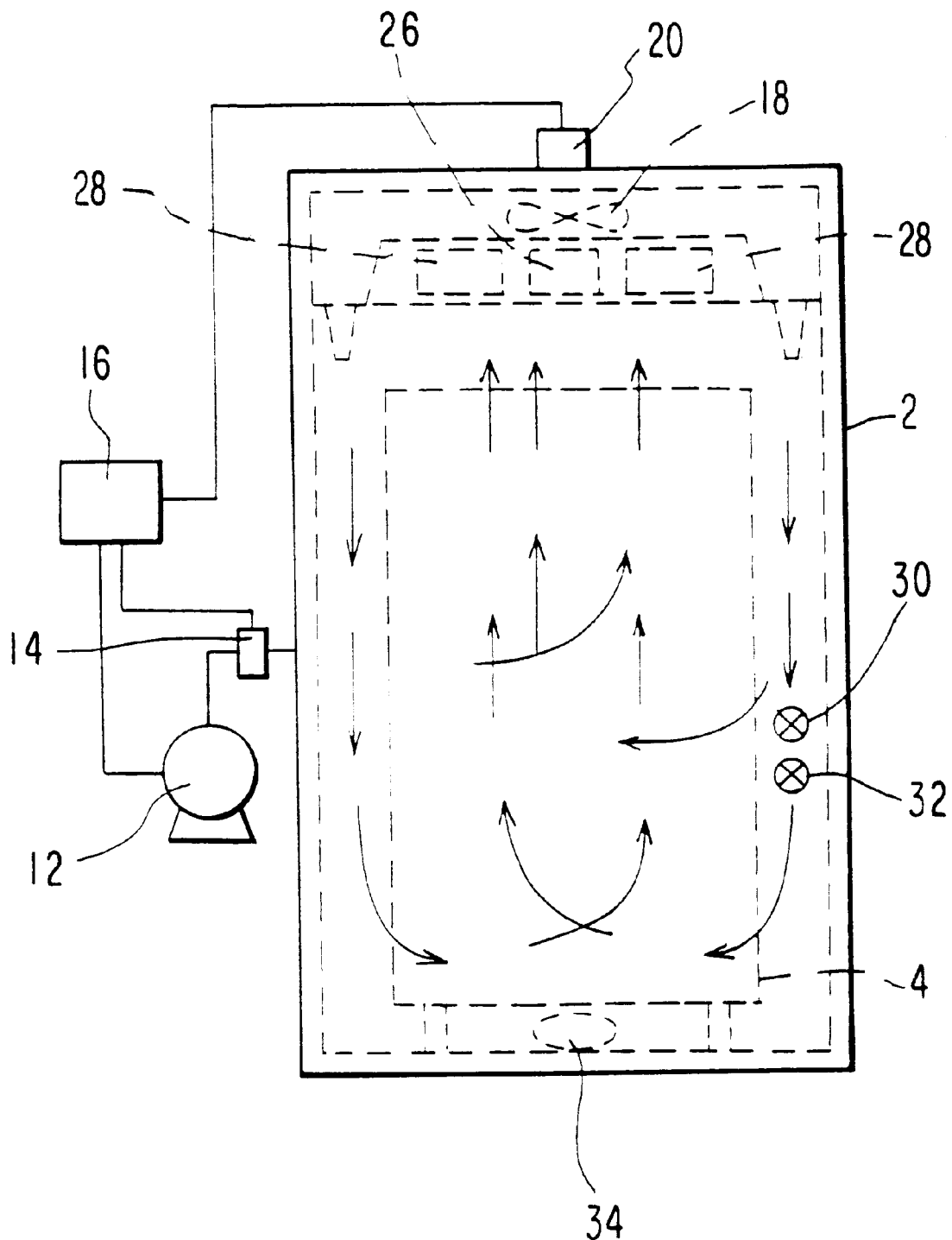
FIG. 3 is an elevational view of another embodiment.

The apparatus may include supply means which comprises not the smoke generator 8 but a liquid smoke cylinder. The liquid smoke cylinder is connected to the smoking chamber 2 by means of valve means for feeding and spouting a liquid smoke into the smoking chamber 2 to smoke the meat material with the liquid smoke. For example, the liquid smoke cylinder is connected to a nozzle head 34 by means of valve means as shown in FIG. 3. The nozzle head 34 is disposed in the smoking chamber 2 at the central portion thereof to spray the liquid smoke thereinto. The fans 18 direct the air for circulation through the nozzle head 34 in the smoking chamber 2 to entrain and disperse the liquid smoke throughout the smoking chamber 2. The nozzle head 34 may be arranged to finely spray the liquid smoke into the smoking chamber 2 without circulating the air.

Figure 4:
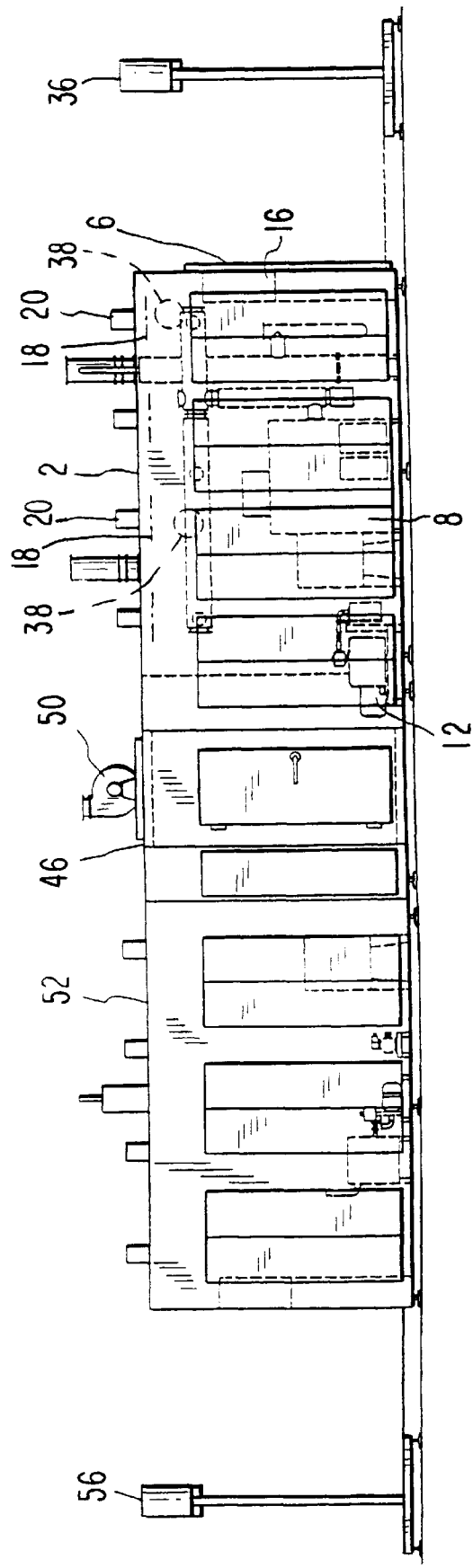
FIG. 4 is a side view of other embodiment.

In another embodiment shown in FIG. 4, the meat material is compressively filled into casings which are then weighed by a meter 36 and fed into and put in the smoking chamber 2 through a door 6. A smoke generator 8 is connected to the smoking chamber 2 by means of valve means for feeding and spouting a smoke into the smoking chamber 2, as in the smoking chamber 2 in FIG. 1. A vacuum pump 12 is connected to the smoking chamber 2 by means of valve means for making the smoking chamber 2 vacuous. A control device 16 is connected to the vacuum pump 12, the smoke generator 8 and the valve means. A plurality of fans 18 are disposed in the smoking chamber 2 adjacent to the top wall thereof and connected to and driven by motors 20 to direct the air upward and downward in the smoking chamber 2.

Figure 5:
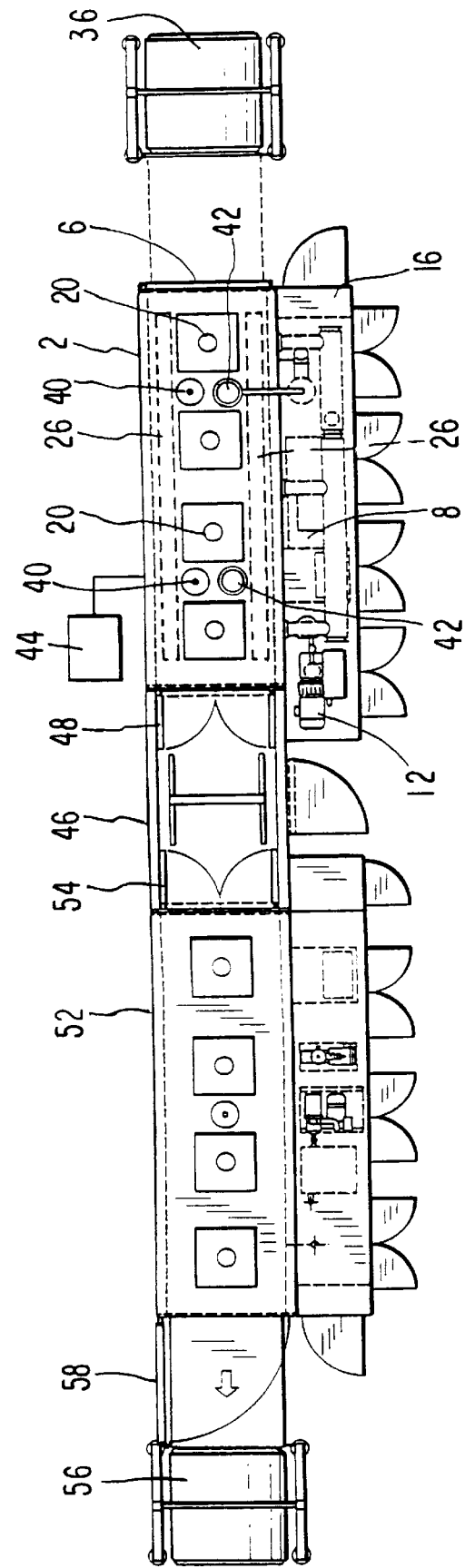
FIG. 5 is a plan view of the apparatus of FIG. 4.
Figure 6:
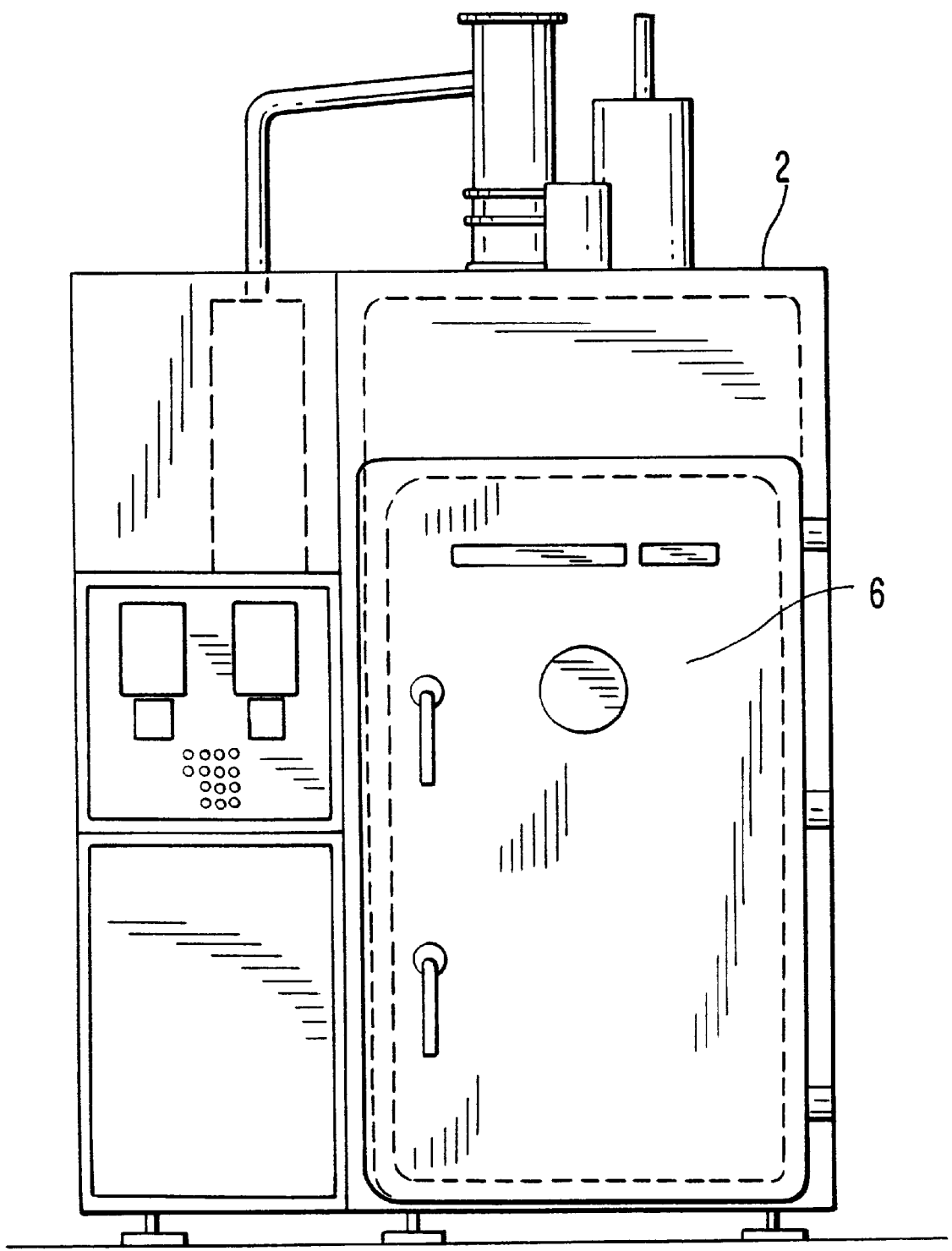
FIG. 6 is an elevational view of the apparatus of FIG. 4.

In addition, in the embodiment, the apparatus is intended to process a smoked and cooked ham. In this connection, the smoking chamber 2 includes heater means which comprises heaters 26 which are disposed in the smoking chamber 2 adjacent to the top wall thereof, as shown in FIG. 5, for heating the interior of the smoking chamber 2. The smoking chamber 2 further includes spray nozzle means which comprises a plurality of spray nozzles 38 disposed in the smoking chamber 2 adjacent to the top wall thereof for spraying a water into the smoking chamber 2. The smoking chamber 2 further includes ventilating means which comprises inlet and outlet valve means 40 and 42 in the form of flaps. The valve means 40 and 42 are disposed in ports formed in the top wall of the smoking chamber 2 for ventilating the interior of the smoking chamber 2.

The control device 16 is further connected to the heaters 26, the spray nozzles 38 and the valve means 40 and 42 and programmed to firstly operate the vacuum pump 12 so that the vacuum pump 12 makes the smoking chamber 2 vacuous to exhaust the meat material of air after the meat material is fed into and put in the smoking chamber 2. The control device 16 is further programmed to secondly operate the heaters 26 and the spray nozzles 38 so that the heaters 26 heat the interior of the smoking chamber 2, the spray nozzles 38 spraying the water into the smoking chamber 2, to heat and redden the meat material under a relatively high humidity.

The control device 16 is further programmed to thirdly operate the vacuum pump 12 so that the vacuum pump 12 makes the smoking chamber 2 vacuous to re-exhaust the meat material of air. The control device 16 is further programmed to fourthly operate the heaters 26 and the valve means 40 and 42 so that the heaters 26 heat the interior of the smoking chamber 2, the valve means 40 and 42 ventilating the interior of the smoking chamber 2, to heat and dry the meat material under a relatively a low humidity.

The control device 16 is further programmed to fifthly operate the vacuum pump 12 so that the vacuum pump 12 makes the smoking chamber 2 vacuous to re-exhaust the meat material of air. The control device 16 is further programmed to then operate the smoke generator 8 so that the smoke generator 8 spouts the smoke into the smoking chamber 2 to smoke the meat material with the smoke.

In addition, a boiler 44 is connected to the smoking chamber 2 for feeding and spouting a steam into the smoking chamber 2. The control device 16 is further connected to the boiler 44 and programmed to operate the vacuum pump 12 and the boiler 44 after smoking so that the vacuum pump 12 intermittently makes the smoking chamber 2 vacuous to decrease and increase the pressure in the smoking chamber 2 over and over again for fluctuation, the boiler 44 spouting the steam into the smoking chamber 2, to cook the meat material with the steam under the fluctuating pressure.

The apparatus further includes a showering chamber 46 disposed adjacent to the smoking chamber 2. The showering chamber 46 includes showering heads not shown for showering a water onto the meat material. The smoking chamber 2 includes a door 48 which is automatically opened after cooking for directing the steam into the showering chamber 46 from the smoking chamber 2. The showering chamber 46 further includes a fan 50 mounted on the top surface thereof for discharging the steam from the showering chamber 46. The meat material is then fed into the showering chamber 46 from the smoking chamber 2 by a conveyor not shown. The door 48 is automatically closed for showering after the meat material is fed into and put in the showering chamber 46.

The apparatus further includes a cooling chamber 52 disposed adjacent to the showering chamber 46. The cooling chamber 52 includes an air cooling or water cooling unit not shown for cooling the meat material. The showering chamber 46 includes a door 54 which is automatically opened after showering. The meat material is then fed into the cooling chamber 52 from the showering chamber 46 by a conveyor not shown. The door 54 is automatically closed for cooling after the meat material is fed into and put in the cooling chamber 52.

The meat material is discharged from the cooling chamber 52 and then weighed by a meter 56. The cooling chamber 52 includes a door 58 which are manually or automatically opened and closed when and after the meat material is discharged from the cooling chamber 52.

In the apparatus in FIG. 4, it may include supply means which comprises not the smoke generator 8 but a liquid smoke cylinder. The liquid smoke cylinder is connected to the smoking chamber 2 by means of valve means for feeding and spouting a liquid smoke into the smoking chamber 2 to smoke the food material with the liquid smoke as in the smoking chamber 2 in FIG. 3.

After all, the apparatus previously makes the smoking chamber 2 vacuous to exhaust the meat material of air before smoking, as described above with reference to the smoking chamber 2 in FIG. 1, FIG. 3 and FIG. 4. Accordingly, the meat material expands or swells along with the casing in response to the decrease in pressure in the smoking chamber 2 when making the smoking chamber 2 vacuous so that the meat material can be liable to absorption of smoke or liquid smoke. The apparatus then spouts the smoke or liquid smoke into the smoking chamber 2 to smoke the meat material with the smoke or liquid smoke. Accordingly, the smoke or liquid smoke sufficiently permeates into the meat material. The apparatus can therefore smoke the meat material without lowering the quality of ham, without making it difficult to keep a flavor of ham and without fading the colour of ham due to lack of the permeance of smoke or liquid smoke. This lengthens a shelf life or relishing term of ham. In this connection, the apparatus can also be arranged to rapidly smoke the meat material and shorten the smoking time.

In addition, even if the meat material includes a salinity mixed therewith and concentrated toward the tied portion of the casing, the salinity flows and circulates in the meat material and disperses throughout the meat material when exhausting the meat material of air. The apparatus then spouts the smoke or liquid smoke into the smoking chamber 2 to smoke the meat material with the smoke or liquid smoke. The apparatus can therefore smoke the meat material without spoiling the taste of ham due to concentration of the salinity.

Even if the meat material includes air holes or separating layers formed therein, the majority of air holes or separating layers is removed by exhausting the meat material of air. The apparatus then spouts the smoke or liquid smoke into the smoking chamber 2 to smoke the meat material with the smoke or liquid smoke. The apparatus therefore can smoke the meat material in such a way to minimize the air holes or separating layers in the meat material. It is not necessary to cut away the portions from which the air holes or separating layers are removed, for disposal as wastes when slicing the ham. This results in an increase in yield of the meat material.

The apparatus may be arranged to smoke a meat material of sausage or bacon with a smoke or liquid smoke. The apparatus may be arranged to smoke a food material other than the meat material with a smoke or liquid smoke. In any case, the apparatus can exhaust the food material of air before smoking and overcome the problems relating to the permeance of smoke or liquid smoke, the concentration of salinity, the air holes and the separating layers.

What is claimed is:

1. A smoking apparatus for smoking a food material with a smoke or liquid smoke, said apparatus comprising:

a smoking chamber for containing said food material;

smoke or liquid smoke supply means connected to said smoking chamber for feeding and spouting said smoke or liquid smoke into said smoking chamber;

vacuum means connected to said smoking chamber for making said smoking chamber vacuous; and a control device connected to said vacuum means and said supply means, said control device being programmed to previously operate said vacuum means so that said vacuum means makes said smoking chamber vacuous to exhaust said food material of air, and then operate said supply means so that said supply means spouts said smoke or liquid smoke into said smoking chamber to smoke said food material with said smoke or liquid smoke.

2. The apparatus as set forth in claim 1 wherein said supply means comprises a smoke generator connected to said smoking chamber by means of valve means for feeding and spouting said smoke into said smoking chamber, said vacuum means comprising a vacuum pump connected to said smoking chamber by means of valve means for making said smoking chamber vacuous.

3. The apparatus as set forth in claim 1 wherein said supply means comprises a liquid smoke cylinder connected to said smoking chamber by means of valve means for feeding and spouting said liquid smoke into said smoking chamber, said vacuum means comprising a vacuum pump connected to said smoking chamber by means of valve means for making said smoking chamber vacuous.

4. The apparatus as set forth in claim 1 wherein said food material comprises a meat material of ham, said smoking chamber including ventilating means for ventilating the interior of said smoking chamber, said control device being further connected to said ventilating means and programmed to firstly operate said vacuum means so that said vacuum means makes said smoking chamber vacuous to exhaust said meat material of air, secondly operate said ventilating means so that said ventilating means ventilates the interior of said smoking chamber to dry said meat material, then operate said vacuum means so that said vacuum means makes said smoking chamber vacuous to re-exhaust said meat material of air, and then operate said supply means so that said supply means spouts said smoke or liquid smoke into said smoking chamber to smoke said food material with said smoke or liquid smoke.

5. The apparatus as set forth in claim 4 wherein said control device is programmed to alternately operate said vacuum means and said ventilating means to exhaust said meat material of air and dry said meat material over and over again before re-exhausting and smoking.

6. The apparatus as set forth in claim 5 wherein said smoking chamber further includes heater means for heating the interior of said smoking chamber, cooler means for cooling the interior of said smoking chamber, and a temperature sensor for detecting the temperature in said smoking chamber and generating a detecting signal, said control device being further connected to said heater means, said cooler means and said temperature sensor and programmed to operate said heater means or said cooler means in response to said signal from said temperature sensor to adjust and maintain the temperature in said smoking chamber within a predetermined range of temperature.

7. The apparatus as set forth in claim 5 wherein said smoking chamber further includes a humidity sensor for detecting the humidity in said smoking chamber and generating a detecting signal, said control device being further connected to said humidity sensor and programmed to operate said ventilating means in response to said signal from said humidity sensor to adjust and maintain the humidity in said smoking chamber within a predetermined range of humidity when drying.

8. The apparatus as set forth in claim 1 wherein said food material comprises a meat material of ham, said smoking chamber including heater means for heating the interior of said smoking chamber, spray nozzle means for spraying a water into said smoking chamber, and ventilating means for ventilating the interior of said smoking chamber, said control device being further connected to said heater means, said spray nozzle means and said ventilating means and programmed to firstly operate said vacuum means so that said vacuum means makes said smoking chamber vacuous to exhaust said meat material of air, secondly operate said heater means and said spray nozzle means so that said heater means heats the interior of said smoking chamber, said spray nozzle means spraying said water into said smoking chamber, to heat and redden said meat material under a relatively high humidity, then operate said heater means and said ventilating means so that said heater means heats the interior of said smoking chamber, said ventilating means ventilating the interior of said smoking chamber, to heat and dry said meat material under a relatively low humidity, then operate said vacuum means so that said vacuum means makes said smoking chamber vacuous to re-exhaust said meat material of air, and then operate said supply means so that said supply means spouts said smoke or liquid smoke into said smoking chamber to smoke said food material with said smoke or liquid smoke.

9. The apparatus as set forth in claim 8 further comprising boiler means connected to said smoking chamber for feeding and spouting a steam into said smoking chamber, said control device being further connected to said boiler means and programmed to operate said vacuum means and said boiler means after smoking so that said vacuum means intermittently makes said smoking chamber vacuous to decrease and increase the pressure in said smoking chamber over and over again for fluctuation, said boiler means spouting said steam into said smoking chamber, to cook said meat material with said steam under the fluctuating pressure.

10. The apparatus as set forth in claim 9 further comprising a showering chamber disposed adjacent to said smoking chamber for showering a water onto said meat material, and a cooling chamber disposed adjacent to said showering chamber for cooling said meat material, said meat material being fed into said showering chamber from said smoking chamber for showering, said meat material being then fed into said cooling chamber from said showering chamber for cooling.

* * * * *